(12) United States Patent
Hanami

(10) Patent No.: US 7,187,803 B2
(45) Date of Patent: Mar. 6, 2007

(54) MOTION DETECTING DEVICE AND SEARCH REGION VARIABLE-SHAPED MOTION DETECTOR

(75) Inventor: Atsuo Hanami, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 730 days.

(21) Appl. No.: 10/651,976

(22) Filed: Sep. 2, 2003

(65) Prior Publication Data

US 2004/0165663 A1    Aug. 26, 2004

(30) Foreign Application Priority Data

Jan. 10, 2003  (JP) .............................. 2003-004688

(51) Int. Cl.
*G06K 9/36*  (2006.01)
(52) U.S. Cl. ...................... 382/236; 382/238; 382/239
(58) Field of Classification Search ................ 382/236, 382/238, 239, 190; 375/240.16; 348/699; 341/51; 386/109
See application file for complete search history.

(56) References Cited

U.S. PATENT DOCUMENTS

| | | | | |
|---|---|---|---|---|
| 5,561,475 | A * | 10/1996 | Jung | 348/699 |
| 5,838,391 | A * | 11/1998 | Kim | 348/699 |
| 6,081,209 | A * | 6/2000 | Schuyler et al. | 341/51 |
| 6,249,550 | B1 * | 6/2001 | Mizuno et al. | 375/240.24 |
| 6,307,970 | B1 * | 10/2001 | Schuyler et al. | 382/236 |
| 6,348,954 | B1 * | 2/2002 | Takishima et al. | 348/699 |
| 6,366,616 | B1 * | 4/2002 | Mizuno et al. | 375/240.24 |

FOREIGN PATENT DOCUMENTS

JP          11-252571          9/1999

OTHER PUBLICATIONS

Lee et al., "Prediction and Search Technique for RD-Optimized Motion Estimation in a Very Low Bit Rate Video Coding Framework", IEEE, vol. 4, Apr. 1997, pp. 2861-2864.*
Zhu et al., "Hexagon-Based Search Pattern for Fast Block Motion Estimation", IEEE, vol. 12, No. 5, May 2005, pp. 349-355.*
Tetsuya Matsumura, et al., "A Single-Chip MPEG-2 422P@ ML Video, Audio, and System Encoder with a 162 MHz Media Processor Core and Dual Motion Estimation Cores", IEICE Transactions on Electronics, vol. E84-C, No. 1, Jan. 2001, pp. 108-122.
"Generic Coding of Moving Pictures and Associated Audio", ISO/IEC 13818-2 Draft International Standard, Mar. 25, 1994, pp. 74-79.

* cited by examiner

*Primary Examiner*—Anh Hong Do
(74) *Attorney, Agent, or Firm*—Oblon, Spivak, McClelland, Maier & Neustadt, P.C.

(57) ABSTRACT

An overall motion detecting device (1) includes a search region variable-shaped motion detector (2) and an overall motion information generator (3). The overall motion information generator (3) controls a surveillance camera (5) which is an external image capturing system and supplies control information of the surveillance camera (5) (such as moving direction, angular speed and focal length) to the search region variable-shaped motion detector (2) as overall motion information (S3). The search region variable-shaped motion detector (2) calculates a motion vector (mv) while renewing, by picture, a search region having a search shape determined by the overall motion information (S3) and a region area suitable for its operational capability.

17 Claims, 18 Drawing Sheets

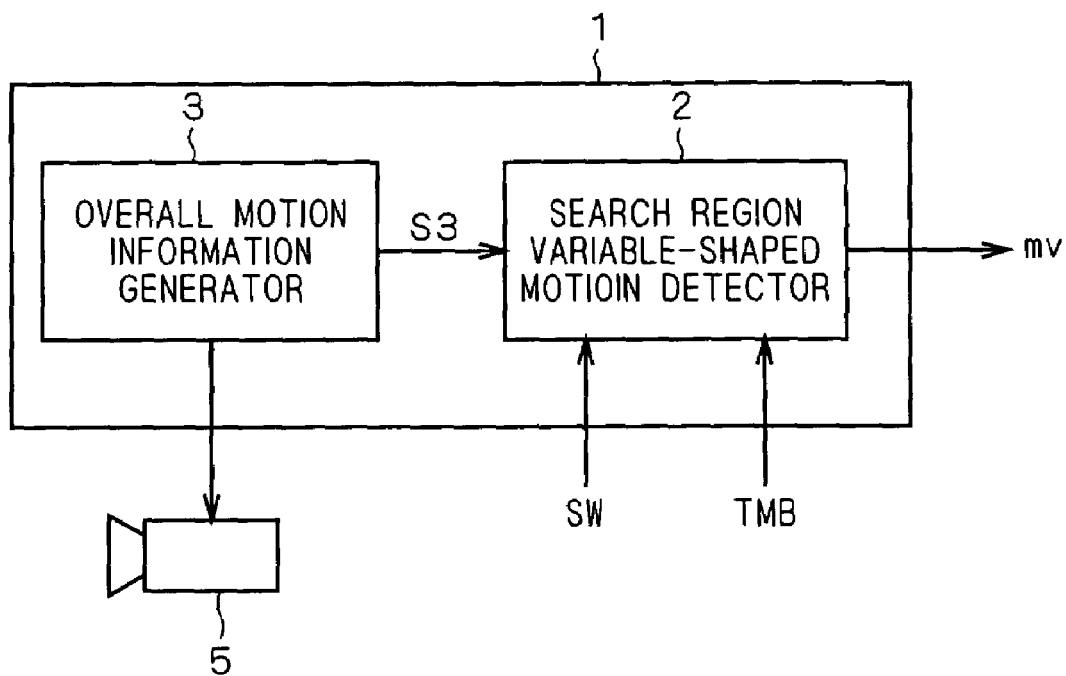
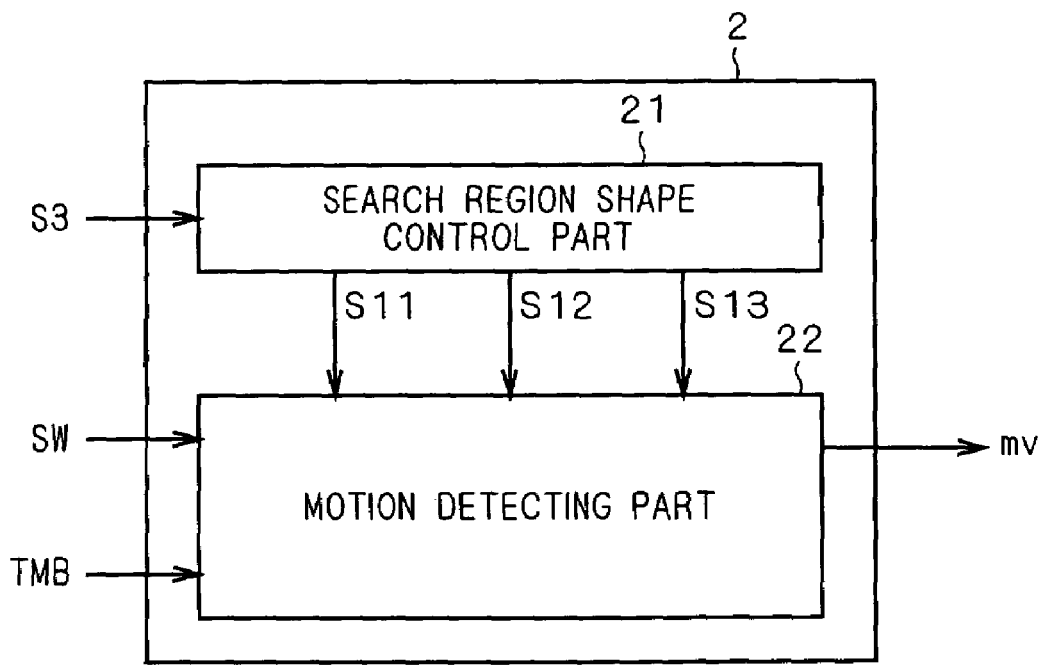

F I G . 1 5

| DIRECTION | HORIZONTAL/VERTICAL | | DIAGONAL |
|---|---|---|---|
| EXTENT OF MOTION | GREAT (EXCEEDING RECTANGULAR RANGE) | SMALL | GREAT/SMALL |
| SELECTED SHAPE | RHOMBUS | RECTANGLE | PARALLELOGRAM |

# MOTION DETECTING DEVICE AND SEARCH REGION VARIABLE-SHAPED MOTION DETECTOR

BACKGROUND OF THE INVENTION

1. Field of the Invention

The present invention relates to a motion detecting device for generating a motion vector, applicable to video encoding standards using motion compensation such as MPEG-1, MPEG-2 and MPEG-4.

2. Description of the Background Art

Among conventional motion (vector) detecting devices for determining search ranges is an optimum motion vector search section in a video encoding device disclosed in Japanese Patent Application Laid-Open No. 11-252571 (1999).

This optimum motion vector search section includes a search range determining part and a predicted motion vector peripheral search part. The search range determining part obtains the size of search range based on an allowable calculation amount given by an external control part. The predicted motion vector peripheral search part determines the shape of search region based on the distribution of motion vectors already obtained, and the size of search range as the size determined by the search range determining part.

In a conventional motion detecting device, the size of search region (search range) varies according to an allowable calculation amount, so that the search range is determined as having such a size that prevents the device from sufficiently exerting the processing capability. This is one of factors that disadvantageously prevent effective generation of a motion vector.

SUMMARY OF THE INVENTION

It is an object of the present invention to provide a motion detecting device capable of effectively generating a motion vector.

According to a first aspect of the invention, the motion detecting device for generating a motion vector in image data to be encoded includes an overall motion information generator and a search region variable-shaped motion detector. The overall motion information generator is configured to generate overall motion information indicative of overall motion of an image specified by the image data. The search region variable-shaped motion detector is configured to determine a search shape as a determined search shape based on the overall motion information and to set a search region having an area determined by the determined search shape and operational capability of the search region variable-shaped motion detector, and to perform a comparison operation in the search region between current image data and reference image data in the image data, thereby generating a motion vector. The determined search shape varies at a predetermined timing as the overall motion information varies.

The motion vector is obtained while varying the determined search shape at the predetermined timing as the overall motion information varies. Thus, it is possible to obtain the motion vector of high accuracy with effective processing.

Further, the search region is set to have a region area based on the operational capability of the search region variable-shaped motion detector. Thus, it is always possible to set the search region having a region area suitable for the operational capability of the search region variable-shaped motion detector even when the determined search shape varies.

According to a second aspect of the invention, the search region variable-shaped motion detector for detecting a motion vector in image data to be encoded includes a search region shape control part and a motion detecting part. The search region shape control part is configured to receive overall motion information indicative of overall motion of an image and to determine a search shape as a determined search shape based on the overall motion information and to set a search region having an area determined by the determined search shape and predetermined operational capability, and to output a selection signal for selecting, by a predetermined unit, at least one of current image and reference image in the image data in accordance with the search region. The motion detecting part is configured to perform a comparison operation between the reference image and the current image in the image data based on the selection signal, thereby detecting the motion vector. The predetermined operational capability includes operational capability of the motion detecting part.

The motion vector is obtained while varying the determined search shape at the predetermined timing as the overall motion information varies. Thus, it is possible to obtain the motion vector of high accuracy with effective processing.

Further, the search region is set to have a region area based on the operational capability of the search region variable-shaped motion detector. Thus, it is always possible to set the search region having a region area suitable for the operational capability of the search region variable-shaped motion detector even when the determined search shape varies.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating the configuration of a motion detecting device according to a first preferred embodiment of the present invention;

FIG. 2 is a block diagram illustrating the internal configuration of a search region variable-shaped motion detector shown in FIG. 1;

FIG. 15 is a table showing an example of details on a search region selected by a search region shape control part based on overall motion information in a motion detecting device according to a seventh preferred embodiment of the invention;

DESCRIPTION OF THE PREFERRED EMBODIMENTS

First Preferred Embodiment

Figure 3:
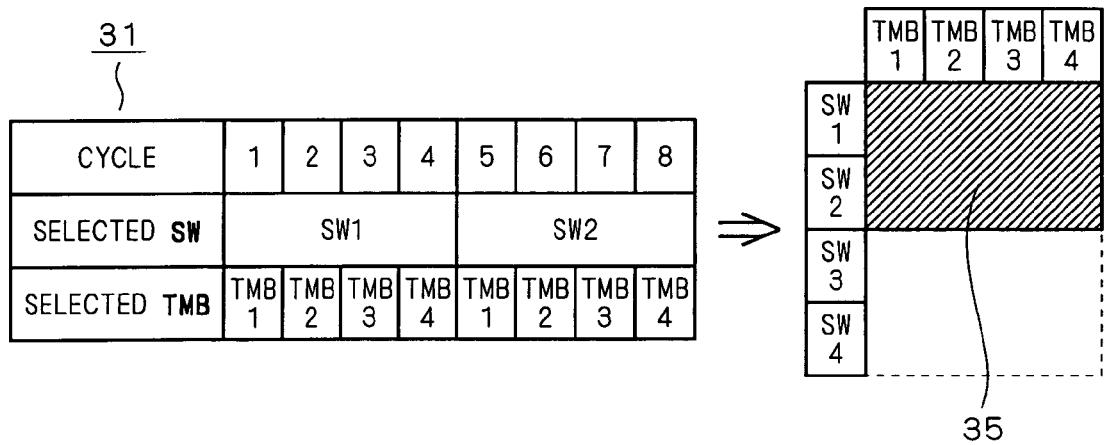
FIG. 3 is a first illustrative example of relationship of details on selection control of reference image data SW and current image data TMB with the shape of a resulting search region.

FIG. 1 is a block diagram illustrating the configuration of a motion detecting device according to a first preferred embodiment of the present invention. As shown, a motion detecting device 1 includes a search region variable-shaped motion detector 2 and an overall motion information generator 3. The generator 3 controls a surveillance camera 5 which is an external image capturing system.

The overall motion information generator 3 supplies control information of the surveillance camera 5 (such as moving direction, angular speed and focal length) to the search region variable-shaped motion detector 2 as overall motion information S3.

For instance, the motion of the surveillance camera 5 is generally controlled by control information of a microcontroller. Thus, the overall motion information generator 3 having the function of such microcontroller may supply the search region variable-shaped motion detector 2 with the control information itself as the overall motion information S3. The control information is information indicative of overall motion of an image specified by image data captured by the surveillance camera 5.

FIG. 2 is a block diagram illustrating the internal configuration of the search region variable-shaped motion detector 2. As shown, the motion detector 2 includes a search region shape control part 21 and a motion detecting part 22. The shape control part 21 determines the shape of search region based on the overall motion information S3 obtained from the overall motion information generator 3, then sets a search region of region area determined by the above-mentioned determined search shape and operational capability of the detecting part 22, and outputs a current image selection signal S11, a reference image selection signal S12 and the other selection signal S13 for realizing the search region, to the detecting part 22.

Here, the search region represents a region that corresponds to part of a screen for detecting a motion vector. The region area represents the area of search region, and the search shape represents the shape of search region. A current image is an image to be encoded, and a reference image is a previous or subsequent image with respect to the current image, used for comparison with the current image. Respective pixel values of the current image and reference image are compared to obtain a motion vector. The motion vector represents a vector indicative of the extent and direction of motion of part of an image between frames or the like.

Upon receipt of reference image data SW in image data obtained from the surveillance camera 5 and current image data TMB (usually obtained when encoding the image data), The motion detecting part 22 performs a comparison operation between reference image data SW and current image data TMB in a search region determined by the current image selection signal S11 and reference image selection signal S12, thereby outputting a motion vector mv based on the result of comparison.

Figure 4:
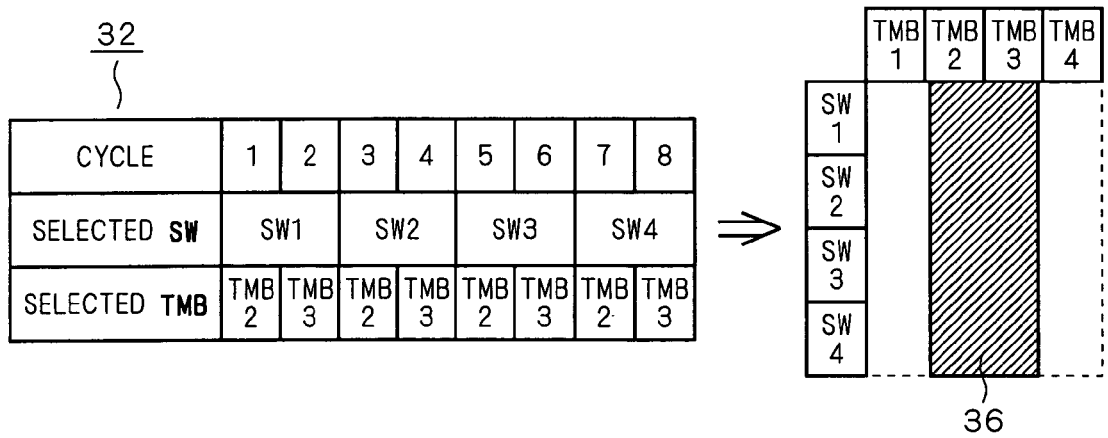
FIG. 4 is a second illustrative example of relationship of details on selection control of reference image data SW and current image data TMB with the shape of a resulting search region.
Figure 5:
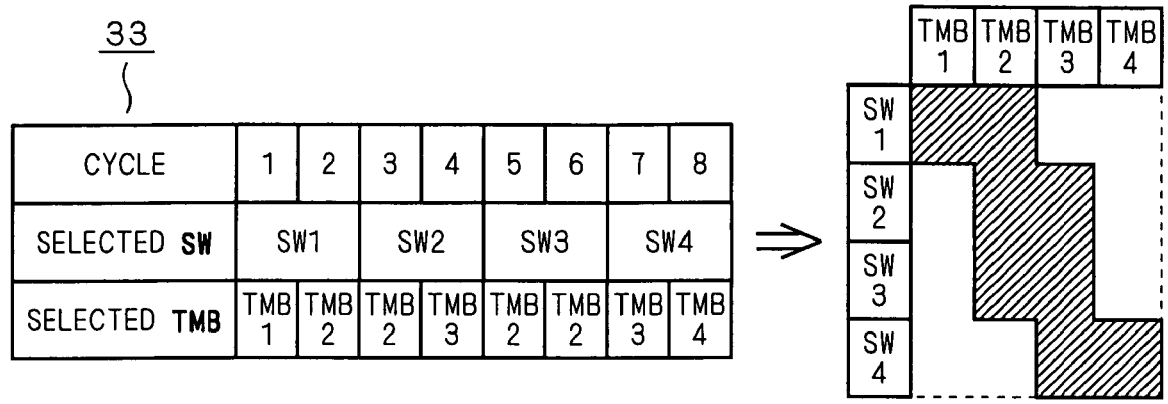
FIG. 5 is a third illustrative example of relationship of details on selection control of reference image data SW and current image data TMB with the shape of a resulting search region.

FIGS. 3 to 5 are illustrative examples of relationship of details on selection control of reference image data SW and current image data TMB with the shape of a resulting search region. In these examples, it is assumed that the number of macroblocks including 16-by-16 pixels or the like that can be selected by each of reference image data SW and current image data TMB is four, operational capability of the motion detecting part 22 is eight cycles and a comparison between reference image data SW and current image data TMB can be performed by macroblock in one cycle. In FIGS. 3 to 5, reference images SW1 to SW4 represent macroblocks adjacent to one another in the vertical direction, and current images TMB1 to TMB4 represent macroblocks adjacent to one another in the horizontal direction. By reducing the space between adjacent ones of the reference images SW1 to SW4 letting the images be partly overlapped, the basic unit of a search region can be made smaller than a macroblock. Thus, a search region can be realized on a pixel basis at the minimum.

In a first selection example 31 shown in FIG. 3, the reference images SW1 and SW2 are each subjected to a comparison operation with the four current images TMB1 to TMB4, thereby determining a horizontally-oriented rectangular search region 35 having an area of 8 macroblocks.

In a second selection example 32 shown in FIG. 4, the reference images SW1 to SW4 are each subjected to a comparison operation with the two current images TMB2 and TMB3, thereby determining a vertically-oriented rectangular search region 36 having an area of 8 macro bocks.

In a third selection example 33 shown in FIG. 5, the reference image SW1 is subjected to a comparison operation with the two current images TMB1 and TMB2, the reference images SW2 and SW3 with the two current images TMB3 and TMB3, and the reference image SW4 with the two current images TMB3 and TMB4, thereby determining a search region 37 having an area of 8 macroblocks, extending downwardly to the right.

Figure 6:
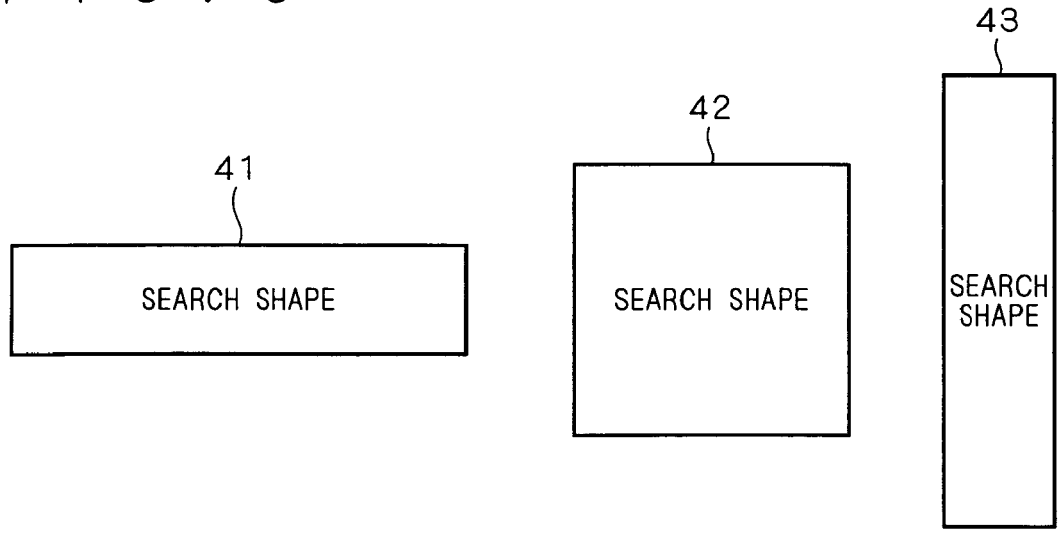
FIG. 6 is an illustrative example of search shapes determined by a search region shape control part shown in FIG. 2.

FIG. 6 is an illustrative example of search shapes determined by the search region shape control part 21. As shown, any one of the following three rectangular search shapes is selected: a horizontally-oriented rectangular search shape 41; a square search shape 42; and a vertically-oriented rectangular search shape 43.

Upon receipt of the overall motion information S3, the search region shape control part 21 selects the search shape 41 when the overall motion information S3 indicates an inclination in the horizontal direction, selects the search shape 43 when the information S3 indicates an inclination in the vertical direction, or selects the search shape 42 when the information S3 indicates that there is no inclination in either the horizontal or vertical direction. The above explains only illustrative examples of search shapes, and the number of search shapes and how search shapes are selected are not limited as above described.

The timing at which the search region shape control part 21 renews a search shape shall be on a picture (one screen) basis. For instance, search is conducted with the search shape 41 for five initial screens judged as including many kinds of motion in the lateral (horizontal) direction, then, with the search shape 42 for next ten screens on which motion is gentle, and thereafter, with the search shape 43 for next three screens judged as including many kinds of motion in the longitudinal (vertical) direction. A minimum control unit as the timing of renewing a search shape shall be a picture of image data.

As described, the motion detecting device of the present embodiment calculates the motion vector mv while renewing, by picture, a search region having a search shape determined by the overall motion information S3 which is the control information on the motion of the surveillance camera 5. Thus, it is possible to obtain the motion vector mv of high accuracy with effective processing.

In addition, by setting the region area of search region based on the operational capability of the motion detecting part 22, a search region of region area suitable for the operational capability of the motion detecting part 22 can always be set even if the selected search shape varies. Conversely saying, the present embodiment can vary the search shape based on the overall motion information S3 while maintaining the region area (calculation amount) of search region constant.

In combination with the renewal of search shape according to the present embodiment, the direction with respect to a reference point of a search region may be shifted.

Further, while the present embodiment has described the motion detecting device 1 including the search region variable-shaped motion detector 2 and overall motion information 3, the motion detector 2 itself has the effect of obtaining the above-described motion vector mv of high accuracy with effective processing by receiving the overall motion information S3 from outside.

Second Preferred Embodiment

Figure 7:
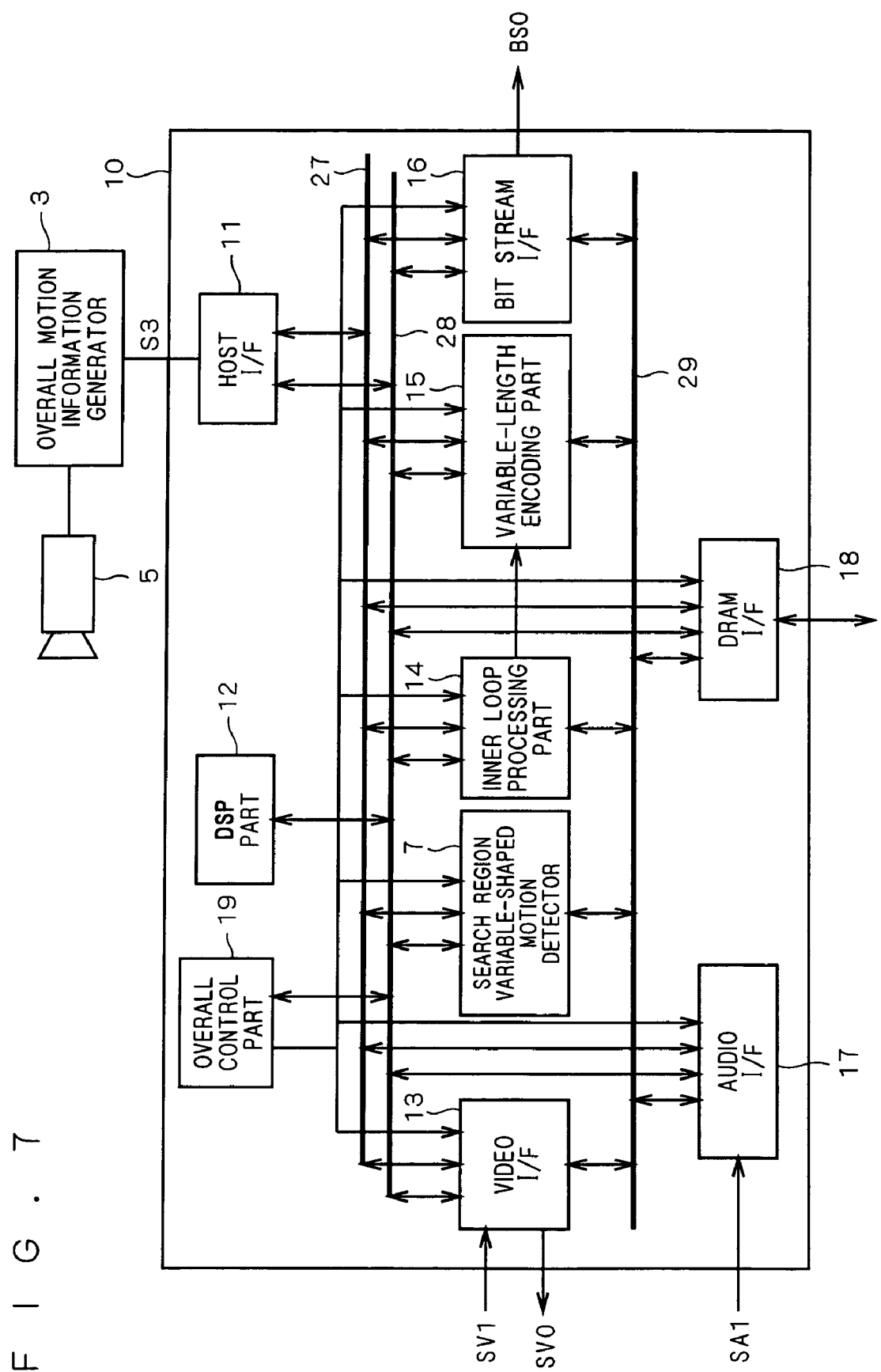
FIG. 7 is a block diagram illustrating the configuration of an MPEG-2 video encoding device according to a second preferred embodiment of the invention.

FIG. 7 is a block diagram illustrating the configuration of an MPEG-2 video (/audio/system) encoding device 10 according to a second preferred embodiment of the invention. The present embodiment describes, by way of example, that a control device (the overall motion information generator 3) for the surveillance camera 5 and an image encoding device are provided separately, and a search region variable-shaped motion detector 7 corresponding to the search region variable-shaped motion detector 2 of the first preferred embodiment is part of the MPEG-2 video encoding device 10.

In this configuration, the overall motion information S3 from the overall motion information generator 3 is transmitted to the search region variable-shaped motion detector 7 through a host I/F 11.

Hereinafter, the internal configuration of the MPEG-2 video encoding device 10 will be described. The host I/F 11 transmits the overall motion information S3 from the overall motion information generator 3 onto a (processor) bus 27 and a (host) bus 28.

A DSP part 12 is connected to the bus 28 and performs various kinds of digital signal processing. A video I/F 13 is connected to the buses 27 to 29 and performs interface processing on a video input SV1 and a video output SV0.

An inner loop processing part 14 is connected to the buses 27 to 29 and performs inner loop processing such as orthogonal transform, quantization, inverse quantization and inverse orthogonal transform, and supplies a quantized signal to a variable-length encoding part 15.

The variable-length encoding part 15 is connected to the buses 27 to 29 and performs variable-length encoding processing based on a signal obtained from the inner loop processing part 14.

The video input SV1, after passing through the video I/F 13, is processed in the inner loop processing part 14 and stored in an external prediction memory through a DRAM I/F 18, whereby the reference data SW is obtained.

The video input SV1, after passing through the video I/F 13, is stored in the prediction memory through DRAM I/F 18, whereby the current image data TMB is obtained. Thus, the reference image data SW and current image data TMB are captured from the prediction memory into the search region variable-shaped motion detector 7 through the DRAM I/F 18.

The search region variable-shaped motion detector 7 performs a comparison operation between reference image data SW and current image data TMB through the DRAM I/F 18 in a search region determined based on the overall motion information S3 obtained through the host I/F 11, thereby calculating a motion vector mv, similarly to the search region variable-shaped motion detector 2 of the first preferred embodiment.

A bit stream I/F 16 is connected to the buses 27 to 29 and outputs a bit stream signal BS0 in accordance with a predetermined order of transmitting encoded data.

An audio I/F 17 is connected to the buses 27 to 29 and performs interface processing on an audio input SA1.

The DRAM I/F 18 is connected to the buses 27 to 29 and performs interface processing on the input and output data in the above-mentioned prediction memory.

An overall control part 19 controls the operations of the components 2 and 13 to 18 except for the host I/F 11 and DSP part 12.

In such configuration, the search region variable-shaped motion detector 7 calculates the motion vector mv based on the overall motion information S3 obtained from the overall motion information generator 3 externally provided, and the MPEG-2 video encoding device 10 performs encoding based on the motion vector mv. Therefore, the same effects can be obtained as those in the first preferred embodiment.

The overall motion information S3 may include the moving direction, angular speed, focal length of the surveillance camera 5 and the like. Since the range of motion varies depending on the focal length even at the same angular speed, information on the focal length is important to obtain a suitable search shape.

Figure 8:
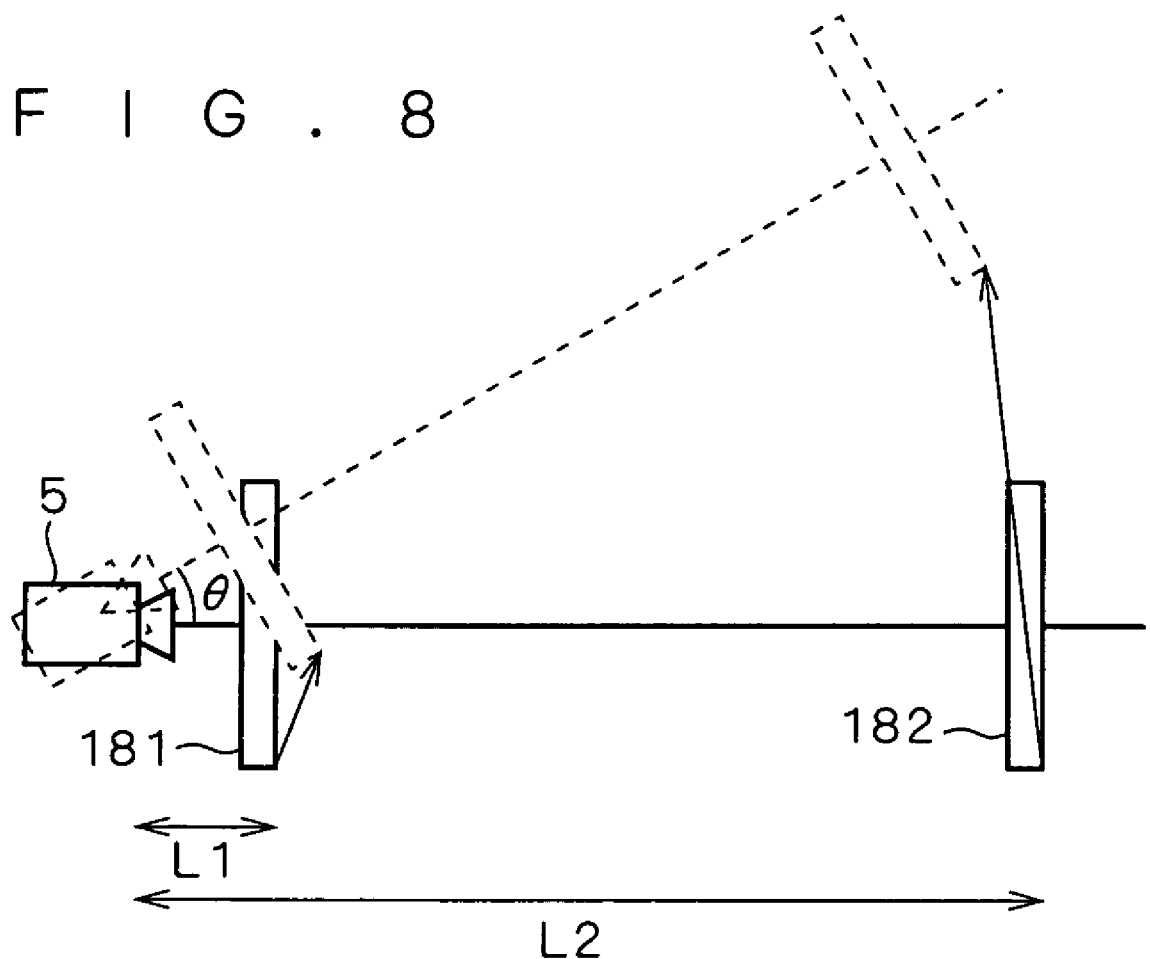
FIG. 8 is an illustrative example of the difference between the travel distances of subjects in accordance with the angle at which a surveillance camera moves and focal lengths.

FIG. 8 is an illustrative example of the difference between the travel distances of subjects in accordance with the angle at which the surveillance camera 5 moves and focal lengths.

As shown, in the case where a subject to be captured is a screen 181 having a focal length L1, the screen 181 moves only slightly when the surveillance camera 5 moves at an angle θ. However, in the case of a screen 182 having a focal length L2 (>L1), the screen 182 moves a great distance away when the camera 5 moves at the same angle θ. In other words, as the focal length increases, the extent of motion on a screen at the same angle increases. This shows the importance of information on the focal length in the overall motion information S3.

Third Preferred Embodiment

Figure 9:
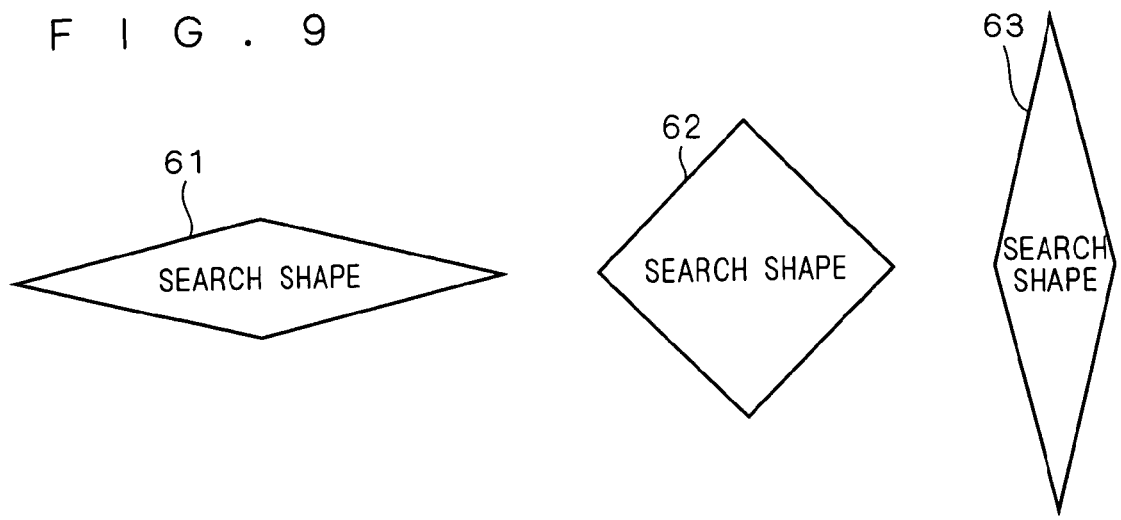
FIG. 9 is an illustrative example of search shapes determined by a search region shape control part in a motion detecting device according to a third preferred embodiment of the invention.

FIG. 9 is an illustrative example of search shapes determined by the search region shape control part 21 in a motion detecting device according to a third preferred embodiment of the invention. An overall configuration may be that of the first preferred embodiment shown in FIGS. 1 and 2 or that of the second preferred embodiment shown in FIG. 7.

As shown in FIG. 9, rhombus is adopted as the basic search shape. A search shape 61 is a horizontally-oriented rhombus, a search shape 62 is a rhombus whose sides in the vertical and horizontal directions have almost the same length, and a search shape 63 is a vertically-oriented rhombus. A search region having any of these search shapes 61 to 63 is realized, for example, on a pixel basis as a structural unit.

Upon receipt of the overall motion information S3, the search region shape control part 21 of the present embodiment selects the search shape 61 when the overall motion information S3 indicates an inclination in the horizontal direction, selects the search shape 63 when the information S3 indicates an inclination in the vertical direction, or selects the search shape 62 when the information S3 indicates that there is no inclination in the horizontal or vertical direction. The other operations are the same as those in the first preferred embodiment.

Therefore, the motion detecting device of the present embodiment exerts the same effects as those in the first preferred embodiment. Further, the motion detecting device of the present embodiment determines the basic search shape as rhombus. Accordingly, in the same region area (calculation amount) of search region, it is possible to determine a search region having a greater inclination than in the first preferred embodiment in which the basic search shape is rectangle. Thus, the motion vector mv can be calculated more effectively. Further, when a search region is realized on a pixel basis, it is possible to determine a rhombus search region of high accuracy in shape.

Although the present embodiment has described the three types of search shapes, they are not limited as such, and any one of arbitrary n types (n>1) may be selected.

Fourth Preferred Embodiment

Figure 10:
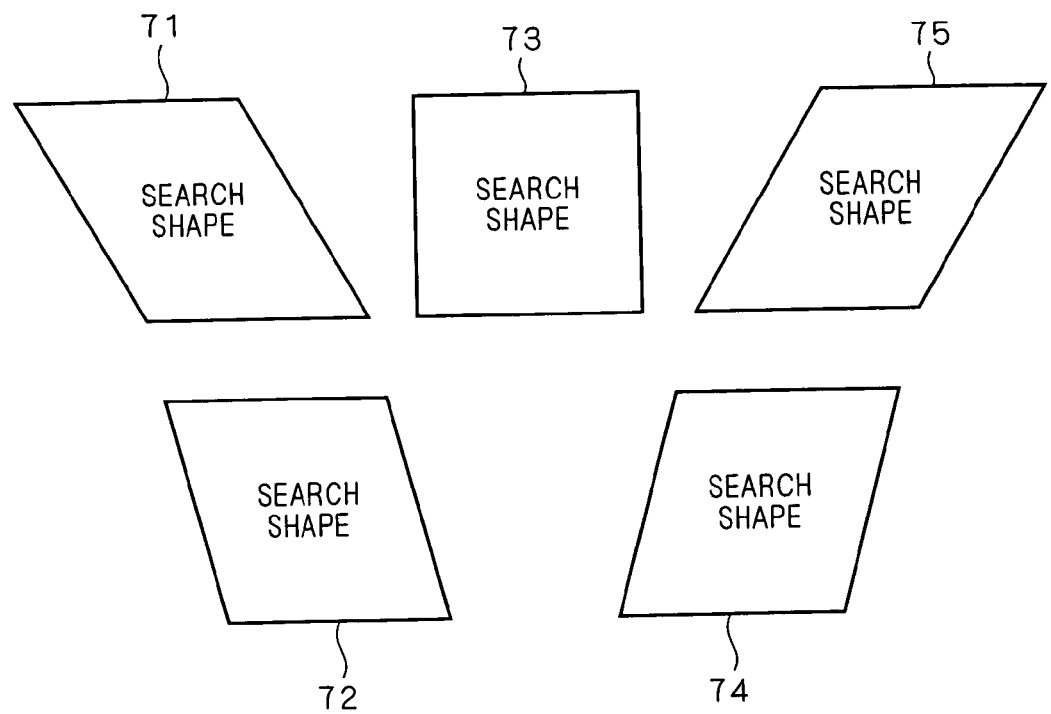
FIG. 10 illustrates examples of search shapes determined by a search region shape control part in a motion detecting device according to a fourth preferred embodiment of the invention.

FIG. 10 illustrates examples of search shapes determined by a search region shape control part in a motion detecting device according to a fourth preferred embodiment of the invention. The overall configuration may be that of the first preferred embodiment shown in FIGS. 1 and 2 or that of the second preferred embodiment shown in FIG. 7.

As shown in FIG. 10, parallelogram (including rectangle) is adopted as a basic search shape. Search shapes 71 and 72 are parallelograms extending upward to the left, a search shape 73 is a rectangle, and search shapes 74 and 75 are parallelograms extending upward to the right. A search region having any of these search shapes 71 to 75 is realized, for example, on a pixel basis.

Upon receipt of the overall motion information S3, the search region shape control part 21 of the present embodiment selects either of the search shapes 71 and 72 when the overall motion information S3 indicates an inclination in the direction upward to the left or downward to the right, selects either of the search shapes 74 and 75 when the information S3 indicates an inclination in the direction upward to the right or downward to the left, or selects the search shape 73 when the information S3 indicates that there is no inclination in any of the directions upward to the left, downward to the right, upward to the right or downward to the left. The other operations are the same as those in the first preferred embodiment.

Therefore, the motion detecting device of the present embodiment exerts the same effects as those in the first preferred embodiment. Further, the motion detecting device of the present embodiment determines the basic search shape as parallelogram, resulting in the effect that the motion vector mv can be calculated more effectively with respect to the motion in a diagonal direction on a screen of an image captured by the surveillance camera 5. Further, when a search region is realized on a pixel basis, it is possible to determine a parallelogrammic search region of high accuracy in shape.

Although the present embodiment has described the five types of search shapes, they are not limited as such, and any one of arbitrary n types (n>1) may be selected.

Fifth Preferred Embodiment

Figure 11:
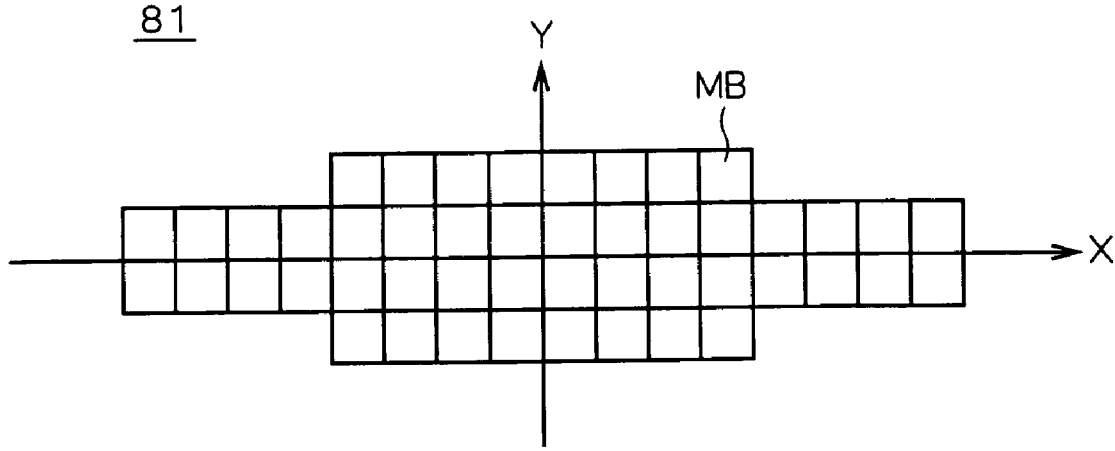
FIG. 11 is a first illustrative example of the search shapes obtained in a motion detecting device according to a fifth preferred embodiment of the invention.
Figure 12:
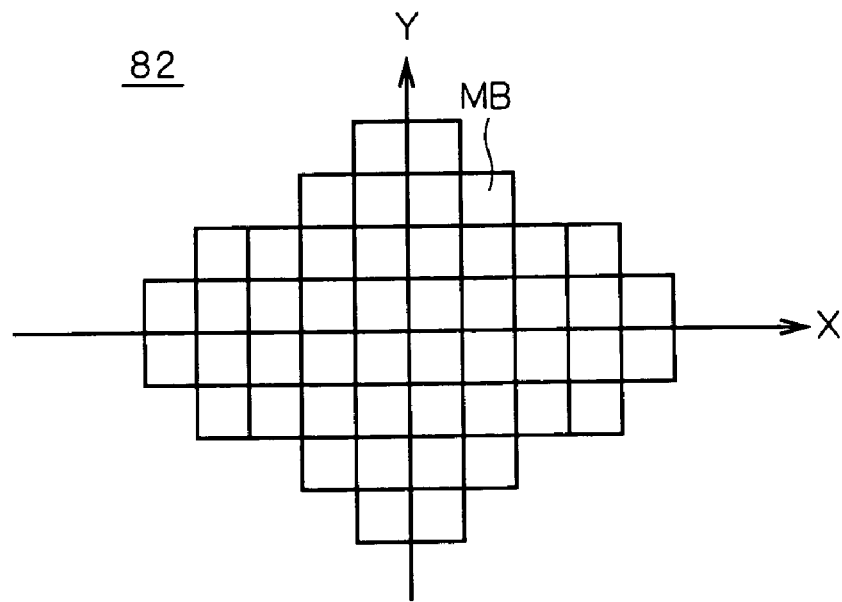
FIG. 12 is a second illustrative example of the search shapes obtained in the motion detecting device according to the fifth preferred embodiment.

FIGS. 11 and 12 are illustrative examples of search shapes obtained in a motion detecting device according to a fifth preferred embodiment of the invention. In the present embodiment, a search region of rhombus search shape according to the third preferred embodiment is realized on a macroblock basis.

As shown in these drawings, a rhombus search region is artificially realized using small square macroblocks MB. A search region 81 shown in FIG. 11 is an example in which a horizontally-oriented rhombus (corresponding to the search shape 61 shown in FIG. 9) is artificially realized by macroblocks MB. A search region 82 shown in FIG. 12 is an example in which a rhombus whose sides in the vertical and horizontal directions have almost the same length (corresponding to the search shape 62 shown in FIG. 9) is artificially realized by macroblocks MB.

In FIGS. 11 and 12, the number of macroblocks MB is 48, respectively. That is, the search regions 81 and 82 can be realized by the same operational capability (region area).

Since the basic operation is the same as that in the third preferred embodiment, the motion detecting device of the present embodiment exerts the same effects as those in the third preferred embodiment. That is, the motion detecting device of the present embodiment can determine a search region having a greater inclination with the same operational capability, similarly to the third preferred embodiment, resulting in the effect that the motion vector mv can be calculated more effectively. Further, since a search region is realized on a macroblock basis, a comparison control between reference image data SW and current image data MTB is advantageously easier than in the case of a search region formed on a pixel basis.

Although the present embodiment has described the two types of search shapes, they are not limited as such, and any one of arbitrary n types (n>1) may be selected.

Sixth Preferred Embodiment

Figure 13:
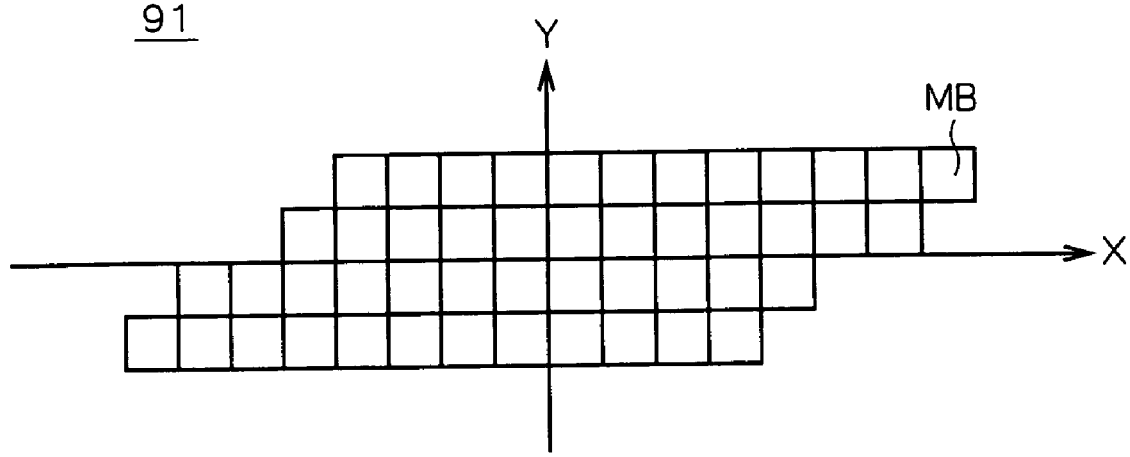
FIG. 13 is a first illustrative example of the search shapes obtained in a motion detecting device according to a sixth preferred embodiment of the invention.
Figure 14:
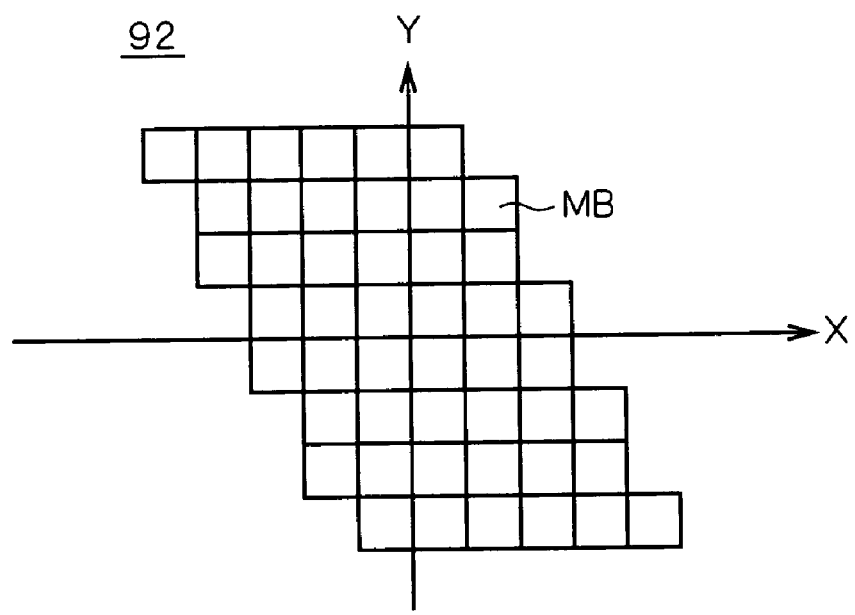
FIG. 14 is a second illustrative example of the search shapes obtained in the motion detecting device according to the sixth preferred embodiment.

FIGS. 13 and 14 are illustrative examples of search shapes obtained in a motion detecting device according to a sixth preferred embodiment of the invention. In the present embodiment, a parallelogrammic search region according to the fourth preferred embodiment is realized on a macroblock basis.

As shown in these drawings, a parallelogrammic search region is artificially realized using macroblocks MB. A search region 91 shown in FIG. 13 is an example in which a gently inclined parallelogram extending upward to the right (corresponding to the search shape 71 shown in FIG. 10) is artificially realized by macroblocks MB. A search region 92 shown in FIG. 12 is an example in which a relatively sharply inclined parallelogram extending upward to the left (corresponding to the search shape 71 shown in FIG. 10) is artificially realized by macroblocks MB.

In FIGS. 13 and 14, the number of macroblocks MB is 48, respectively. That is, the search regions 91 and 92 can be realized by the same operational capability.

Since the basic operation is the same as that in the fourth preferred embodiment, the motion detecting device of the present embodiment exerts the same effects as those in the fourth preferred embodiment. That is, the motion detecting device of the present embodiment exerts the effect that the motion vector mv can be calculated more effectively with respect to the motion in a diagonal direction on a screen of an image captured by the surveillance camera 5. Further, since a search region is realized on a macroblock basis, a comparison control between reference image data SW and current image data MTB is advantageously easier than in the case of a search region formed on a pixel basis.

Although the present embodiment has described the two types of search shapes, they are not limited as such, and any one of arbitrary n types (n>1) may be selected.

Seventh Preferred Embodiment

In the first to sixth preferred embodiments, one of various search shapes of one basic search shape (any of rectangle, rhombus and parallelogram) is selected. In a seventh preferred embodiment of the invention, one of various types of basic shapes is selected as search shape.

FIG. 15 is a table showing an example of details on selection of a search region performed by a search region shape control part based on overall motion information S3 in a motion detecting device according to the present embodiment.

As shown, the search shape is determined based on the direction and extent of motion indicated by the overall motion information S3. For instance, rhombus is selected when the motion is in the horizontal/vertical direction with relatively great extent (i.e., when rectangle is not suitable), and rectangle is selected when the motion is in the horizontal/vertical direction with relatively small extent (i.e., when rectangle is suitable). Parallelogram is selected when the motion is in a diagonal direction.

Since the basic operation is the same as that in the first preferred embodiment, the motion detecting device of the present embodiment exerts the same effects as those in the first preferred embodiment. Further, the motion detecting device of the present embodiment changes the basic shape of search region based on the overall motion information S3, so that there are many variations of basic shapes adaptable to obtained overall motion. Thus, it is possible to calculate the motion vector mv of high accuracy with more effective processing. A search region may be realized on a pixel basis or a macroblock basis.

Although the present embodiment has described the three types of selectable basic shapes, they are not limited as such, and any one of arbitrary m types (m>1) of basic shapes may be selected.

Eighth Preferred Embodiment

While the search shape is determined maintaining search accuracy constant in the first preferred embodiment, the search accuracy is one of factors in determining the search shape in an eighth preferred embodiment of the invention.

Figure 16:
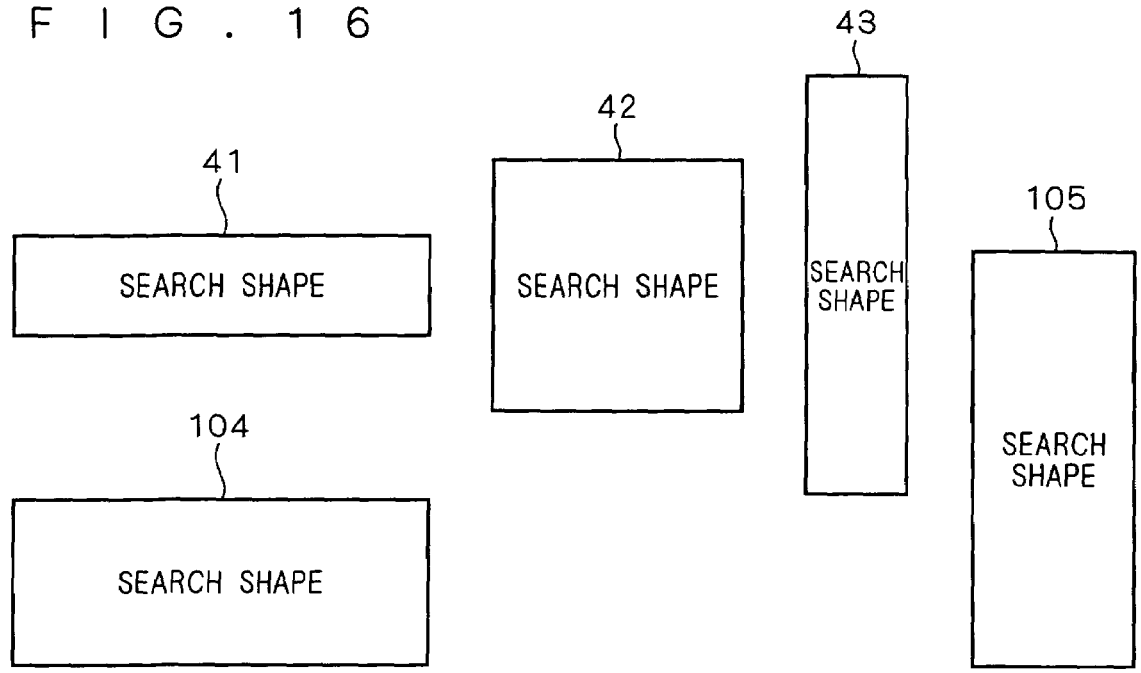
FIG. 16 is an illustrative example of the search shapes determined by a search region shape control part according to an eighth preferred embodiment of the invention.

FIG. 16 is an illustrative example of search shapes determined by a search region shape control part 21. As shown, similarly to the first preferred embodiment shown in FIG. 6, any search shape is selected from among the search shapes 41 to 43 and search shapes 104, 105 both having an area twice that of any of the search shapes 41 to 43 (i.e., half search accuracy).

The search shapes 104 and 105 are both determined to have an area twice that of any of the search shapes 41 to 43 and to have search accuracy half that of any of the search shapes 41 to 43. For instance, when the search accuracy of the search shapes 41 to 43 is set by one pixel, the search accuracy of the search shapes 104 and 105 is set by two pixels (by skipping one pixel). Thus, a search region of any of the search shapes 41 to 43, 104 and 105 can be selected with the same calculation amount.

Since the operations except for the selection of search shapes are the same as that in the first preferred embodiment, the motion detecting device of the present embodiment exerts the same effects as those in the first preferred embodiment. Further, the motion detecting device of the present embodiment can also change the search accuracy based on the overall motion information S3. For instance, when there is little inclination in overall motion, either of the search shapes 104 and 105 is selected emphasizing the region area rather than the search accuracy. When there is a significant inclination in overall motion, any of the search shapes 41 to 43 can be selected emphasizing the search accuracy.

That is, with the motion detecting device of the present embodiment, there are many variations of search regions adaptable to obtained overall motion. Thus, the motion vector mv of high accuracy can be calculated more effective processing.

Although the present embodiment has described selectable basic shapes of two types, they are not limited as such, and any basic shape of arbitrary k types (k>1) may be selected.

Ninth Preferred Embodiment

The first preferred embodiment has described that the renewal timing (predetermined timing) of search region (search shape) is on a picture basis. In a ninth preferred embodiment of the invention, the search shape and search region (including the direction with respect to a reference point) are determined by slice (a plurality of macroblocks) not by picture.

Figure 17:
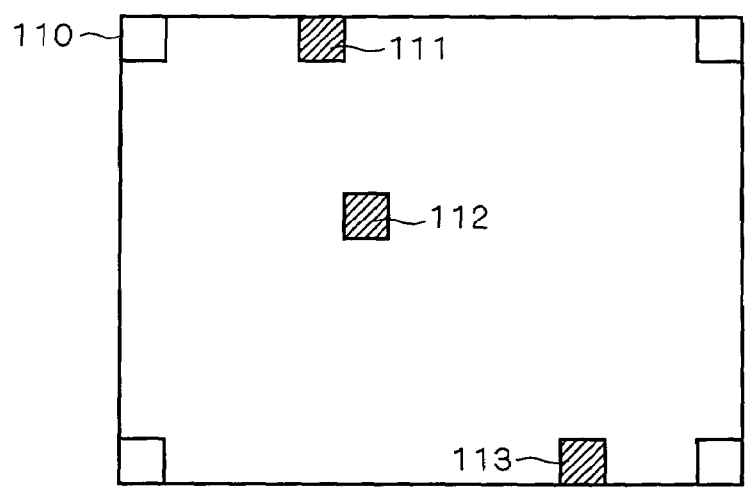
FIG. 17 is an illustrative example of macroblocks on an image in a ninth preferred embodiment of the invention.

FIG. 17 is an illustrative example of macroblocks on an image 110. As shown, a macroblock 111 is in contact with the top end of a screen, a macroblock 112 is present in the center of the screen, and a macroblock 113 is in contact with the bottom end of the screen.

Figure 18:
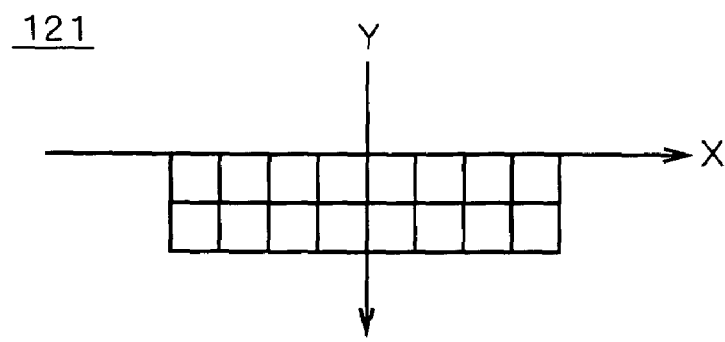
FIG. 18 is an illustrative example of a search region for a first macroblock shown in FIG. 17.
Figure 19:
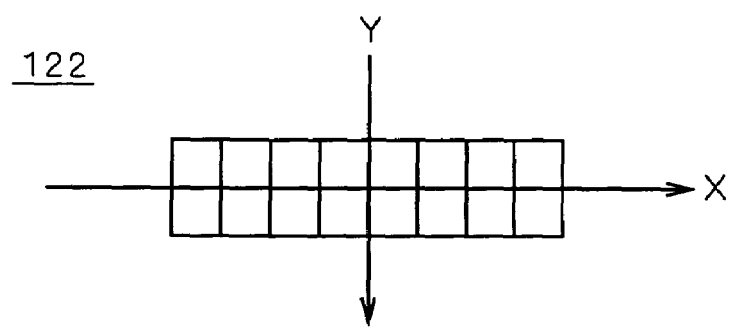
FIG. 19 is an illustrative example of a search region for a second macroblock shown in FIG. 17.
Figure 20:
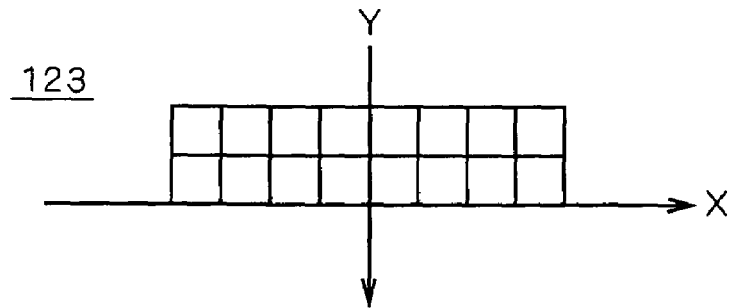
FIG. 20 is an illustrative example of a search region for a third macroblock shown in FIG. 17.

FIGS. 18 to 20 are illustrative examples of search regions for the macroblocks 111 to 113, respectively. Here, it is assumed that the overall motion information S3 outputted from the overall motion information generator 3 indicates that the motion in the horizontal direction is significant and that a search region is set in a register or the like in the search region shape control part 21. The original point (the intersection of X and Y axes) shown in FIGS. 18 to 20 shall be a reference point for determining the direction of forming a search region.

As shown in FIG. 18, a search region 121 is determined for a slice comprised of the topmost group of macroblocks including the macroblock 111. Since the macroblock 111 is present at the top end of the screen and a vertical vector in the negative direction (upward direction of the screen) is not necessary, the search region is set only in the positive direction with respect to the original point.

As shown in FIG. 20, a search region 123 is determined for a slice comprised of the bottommost group of macroblocks including the macroblock 113. Since the macroblock 113 is present at the bottom end of the screen and a vertical vector in the positive direction (downward direction of the screen) is not necessary, the search region is set only in the negative direction with respect to the original point.

As shown in FIG. 19, for slices including the macroblock 112 other than the above slices, a search region 122 is set as usual equally in the positive and negative directions with respect to the original point.

Since the basic operation is the same as that in the first preferred embodiment, the motion detecting device of the present embodiment exerts the same effects as those in the first preferred embodiment. Further, the motion detecting device of the present embodiment changes setting requirements for a search region (including the direction with respect to the original point) by slice. Thus, the motion vector mv can be calculated more effectively.

For instance, with respect to an image in which an upper region with respect to the center of a viewpoint moves rapidly in the upward direction and a lower region moves rapidly in the downward direction, such as an image of a scene seen by a driver of a car moving with high speed, a search region is set by slice. For instance, a search region such as the search region 123 is set for searching only in the upward direction in the above-mentioned upper region and a search region such as the search region 121 for searching only in the downward direction in the above-mentioned lower region. Thus, the motion vector mv of high accuracy can be calculated with more effective processing in the present embodiment.

Although the present embodiment only describes the basic shape of search region as rectangular, other shapes may be adopted.

Tenth Preferred Embodiment

Figure 21:
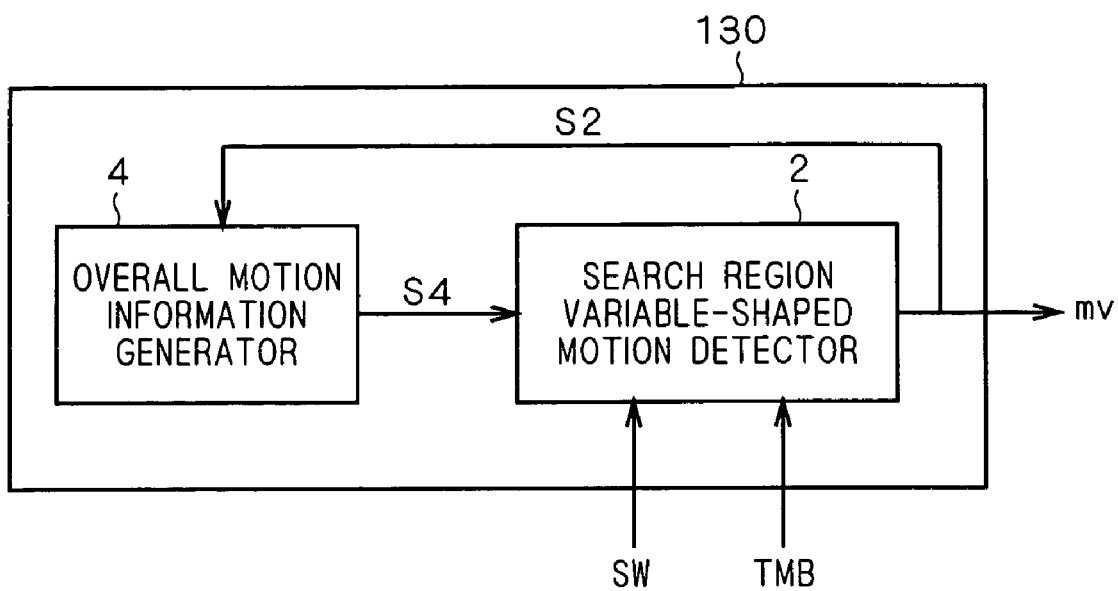
FIG. 21 is a block diagram illustrating the configuration of a motion detecting device according to a tenth preferred embodiment of the invention.

FIG. 21 is a block diagram illustrating the configuration of a motion detecting device according to a tenth preferred embodiment. As shown, a motion detecting device 130 includes the search region variable-shaped motion detector 2 and an overall motion information generator 4.

The overall motion information generator 4 generates overall motion information S4 based on motion vector related information S2 obtained by the search region variable-shaped motion detector 2 including all motion vectors mv per picture and their evaluation values (such as the sum of absolute values of differences which are factors in determining the motion vectors).

Figure 22:
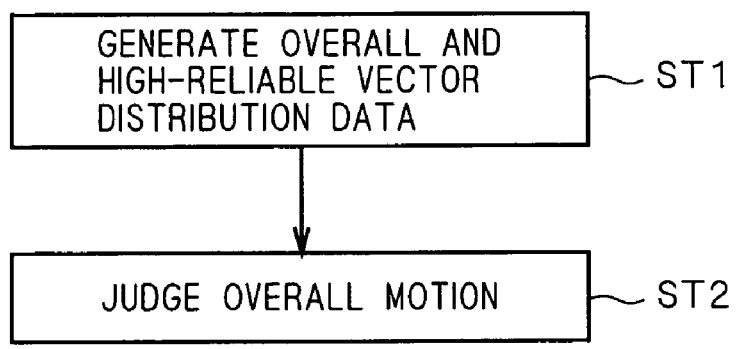
FIG. 22 is a flow chart illustrating a process of generating overall motion information performed by an overall motion information generator.

FIG. 22 is a flow chart illustrating a process of generating the overall motion information S4 performed by the overall motion information generator 4. Referring to the flow chart, overall high-reliable distribution data is generated in step ST1.

Figure 23:
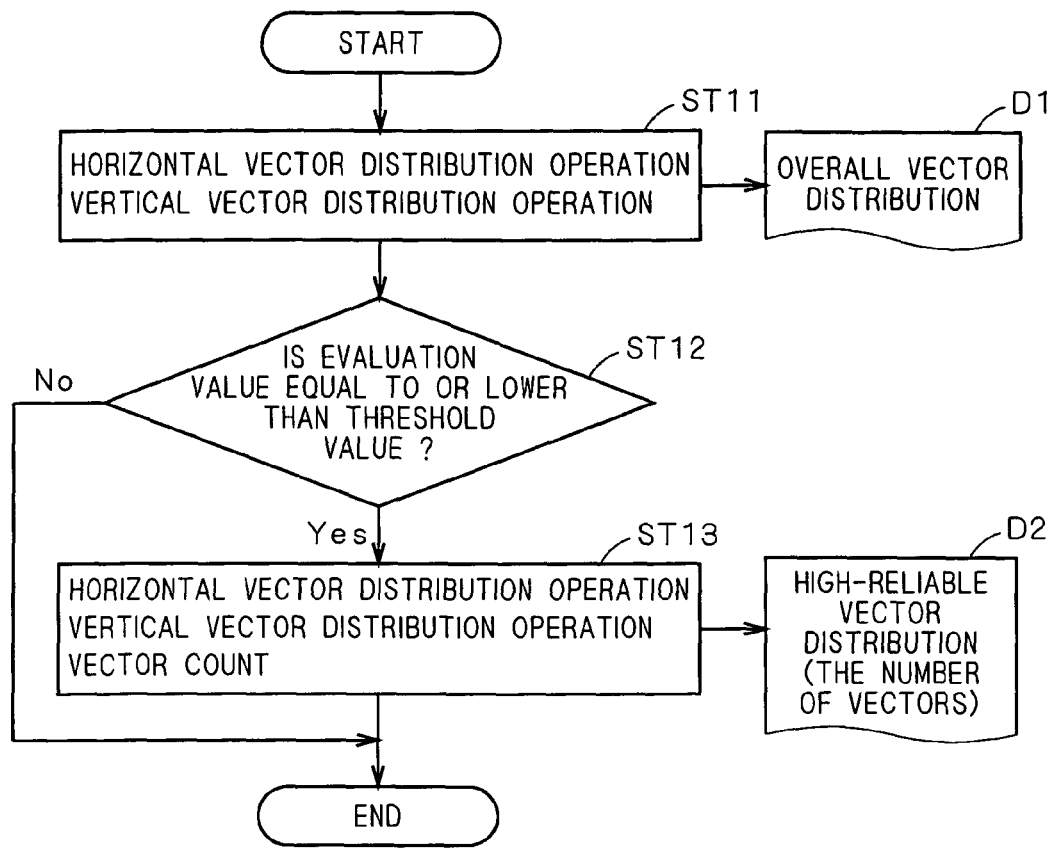
FIG. 23 is a flow chart illustrating details of step ST1 shown in FIG. 22.

FIG. 23 is a flow chart illustrating details of the step ST1 shown in FIG. 22.

Referring to the flow chart, in step ST11, horizontal vector distribution processing and vertical vector distribution processing in all motion vectors in one picture are carried out based on horizontal and vertical components of a motion vector obtained by a predetermined unit (for example, by macroblock MB), thereby obtaining a horizontal vector distribution value VX and a vertical vector distribution value VY as well as obtaining overall vector distribution data D1 indicative of vector distribution of all motion vectors.

Next, in step ST12, a motion vector whose evaluation value is lower than a threshold value is selected as a high-reliable motion vector from among all motion vectors. Only such high-reliable motion vector is a target of processing in step ST13.

In step ST13, horizontal vector distribution processing and vertical vector distribution processing are carried out based on horizontal and vertical components of the high-reliable motion vector, thereby obtaining a high-reliable horizontal vector dispersion value HVX and a high-reliable vertical vector dispersion value HVY as well as obtaining high-liable vector distribution data D2 indicative of vector distribution of all high-reliable motion vectors.

Figure 24:
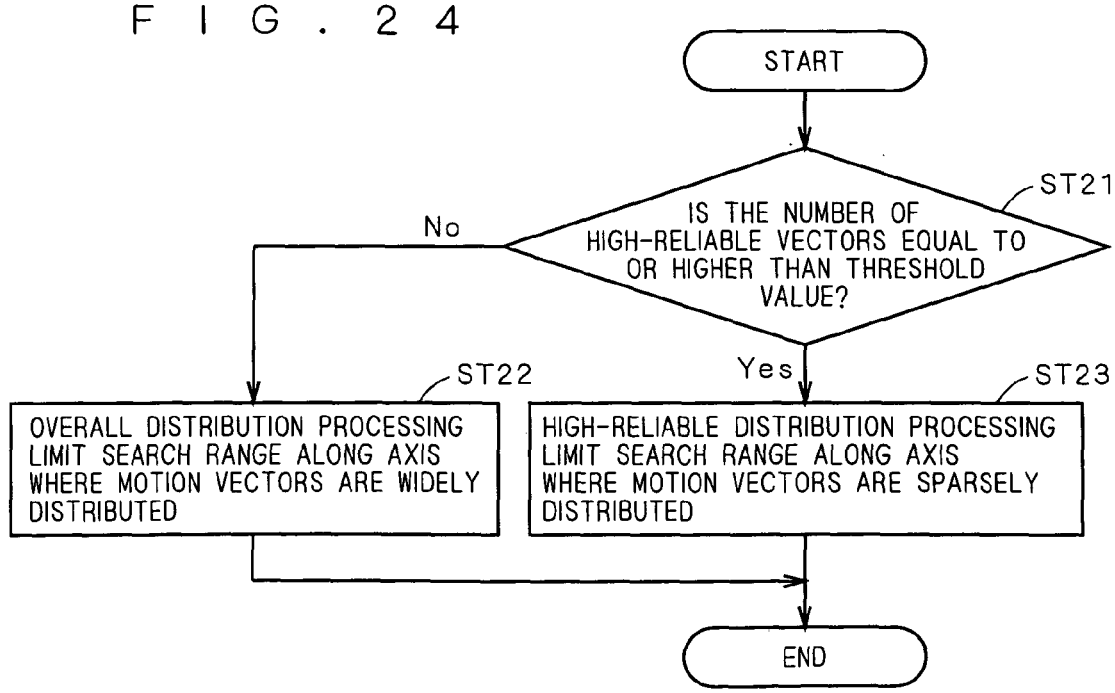
FIG. 24 is a flow chart illustrating details of step ST2 shown in FIG. 22.

Referring back to FIG. 22, the process shifts to overall motion judgment in step ST2. FIG. 24 is a flow chart illustrating details of step ST2 shown in FIG. 22.

Referring to the flow chart, in step ST21, it is checked whether or not the number of high-reliable motion vectors is equal to or higher than a predetermined reference value. If yes, the process shifts to step ST23. If no, the process shifts to step ST22.

In step ST22, when the number of high-reliable motion vectors is lower than the reference value, the overall motion information S4 is generated based on the overall vector distribution data D1 such that a search region is limited along an axis where motion vectors are widely distributed. For instance, when low-reliable overall motion vectors are widely distributed in the vertical direction in the state that the search shape 43 shown in FIG. 6 is selected, the overall motion information S4 is generated which estimates a search in the vertical direction results in bad encoding efficiency and thus indicates that extension in the vertical direction should be prevented (i.e., extension in the horizontal direction should be promoted). As a result, the search region variable-shaped motion detector 2 changes the search shape 43 to search shape 42 based on the overall motion information S4.

In step ST23, when the number of high-reliable motion vectors is equal to or higher than the reference value, the overall motion information S4 is generated based on the high-reliable vector distribution data D2 such that a search region is limited along an axis where motion vectors are sparsely distributed. For instance, when high-reliable overall motion vectors are widely distributed in the vertical direction in the state that the search shape 42 shown in FIG. 6 is selected, the overall motion information S4 is generated which estimates that there is little motion in the vertical direction and thus indicates that extension in the vertical direction should be prevented. As a result, the search region variable-shaped motion detector 2 changes the search shape 42 to search shape 43 based on the overall motion information S4.

That is, the overall motion information S4 generated in step ST22 indicates a motion in a direction where low-reliable overall motion vectors are sparsely distributed, while the information S4 generated in step ST23 indicates a motion in a direction where high-reliable motion vectors are widely distributed.

As described, the overall motion information generator 4 of the motion detecting device 130 of the present embodiment performs statistics shown in FIGS. 22 to 24 based on the motion vector related information S2, thereby generating the overall motion information S4. Thus, it is possible to generate the overall motion information S4 only using the motion vector related information S2 obtained from the search region variable-shaped motion detector 2 without using control information of the surveillance camera 5 as in the first preferred embodiment and the like. This allows simplification of circuit configuration.

Figure 25:
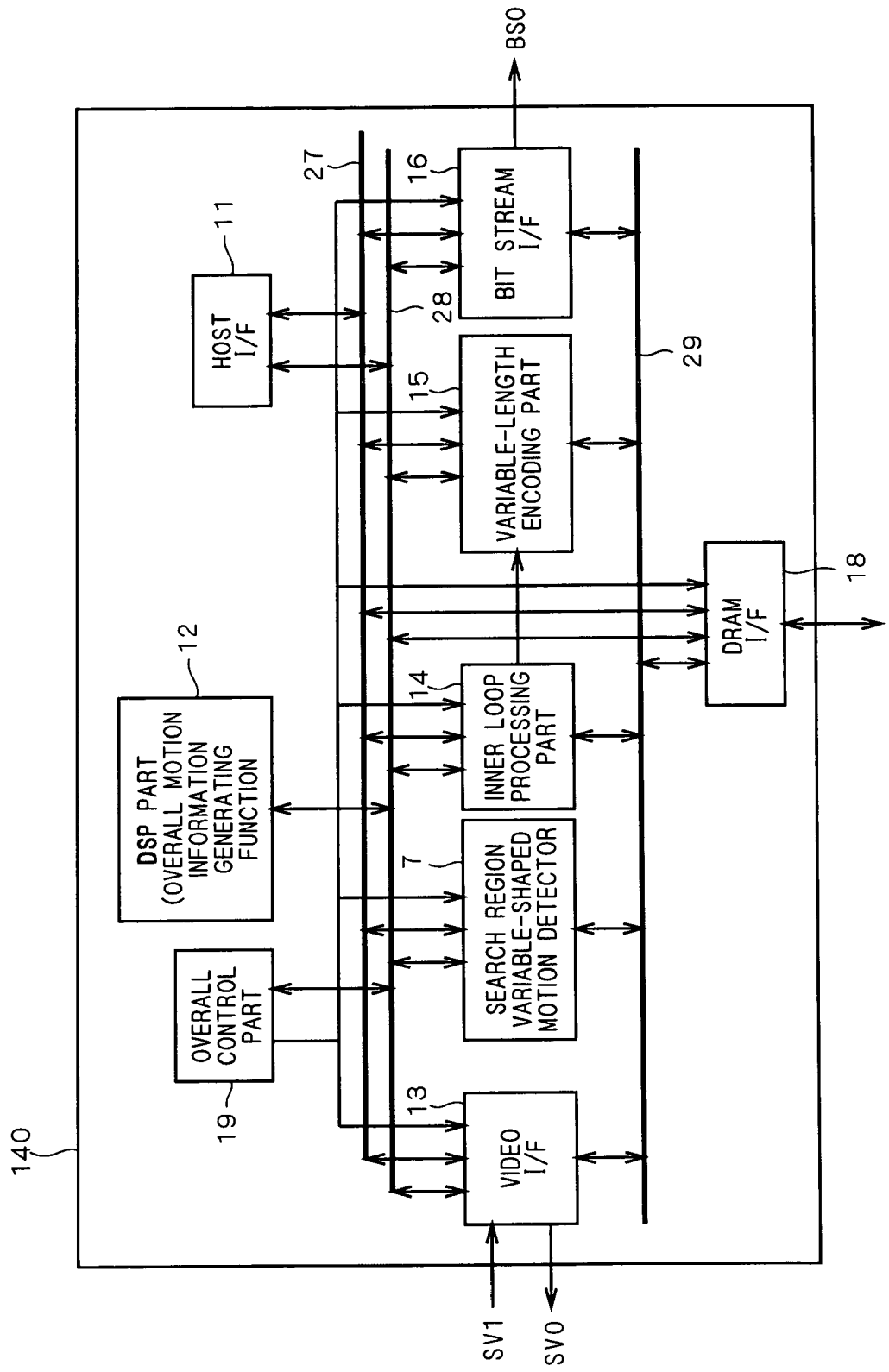
FIG. 25 is a block diagram illustrating the configuration of an MPEG-2 video encoding device according to a tenth preferred embodiment of the invention.

FIG. 25 is a block diagram illustrating the configuration of an MPEG-2 video encoding device 140 (not including audio functions (the audio I/F 17 and the like) according to the present embodiment. Similarly to the second preferred embodiment shown in FIG. 7, the search region variable-shaped motion detector 7 corresponding to the search region variable-shaped motion detector 2 is included in the encoding device 140 and overall motion information generating function realized by the overall motion information generator 4 is provided within the DSP part 12. Other components are the same as those in the second preferred embodiment, explanation of which is thus omitted here.

Figure 26:
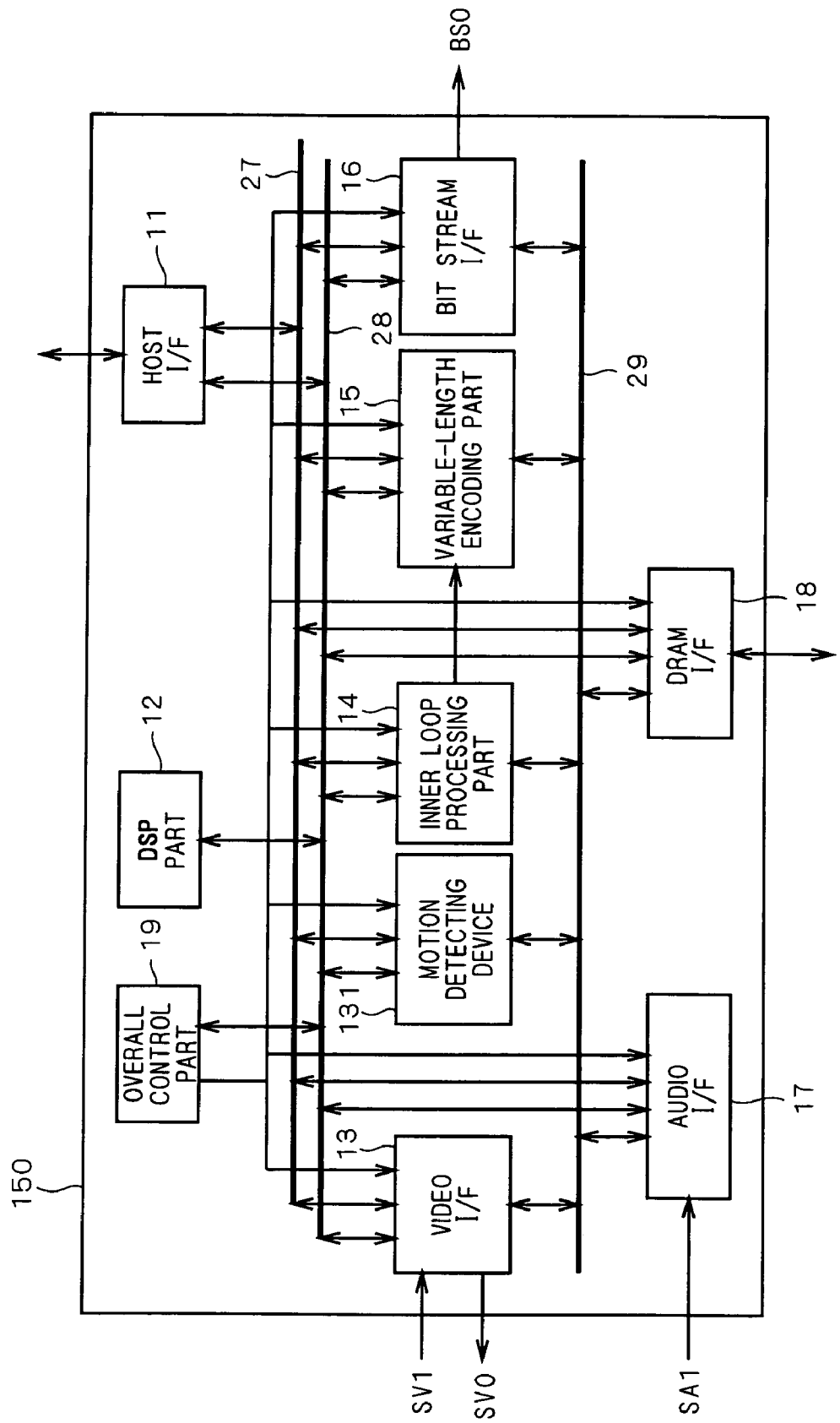
FIG. 26 is a block diagram illustrating the configuration of another MPEG-2 video encoding device according to the tenth preferred embodiment.

FIG. 26 is a block diagram illustrating the configuration of another MPEG-2 video (audio, system) encoding device 150 according to the present embodiment. A motion detecting device 131 corresponding to the motion detecting device 130 shown in FIG. 21 is provided within the MPEG-2 video encoding device 150. Other components are the same as those in the second preferred embodiment, explanation of which is thus omitted here.

Further, while the present embodiment has described the motion detecting device 130 including the search region variable-shaped motion detector 2 and overall motion information generator 4, the motion detector 2 itself has the effect of obtaining the motion vector mv of high accuracy with effective processing by receiving the overall motion information S3 from outside, similarly to the first preferred embodiment.

Eleventh Preferred Embodiment

Figure 27:
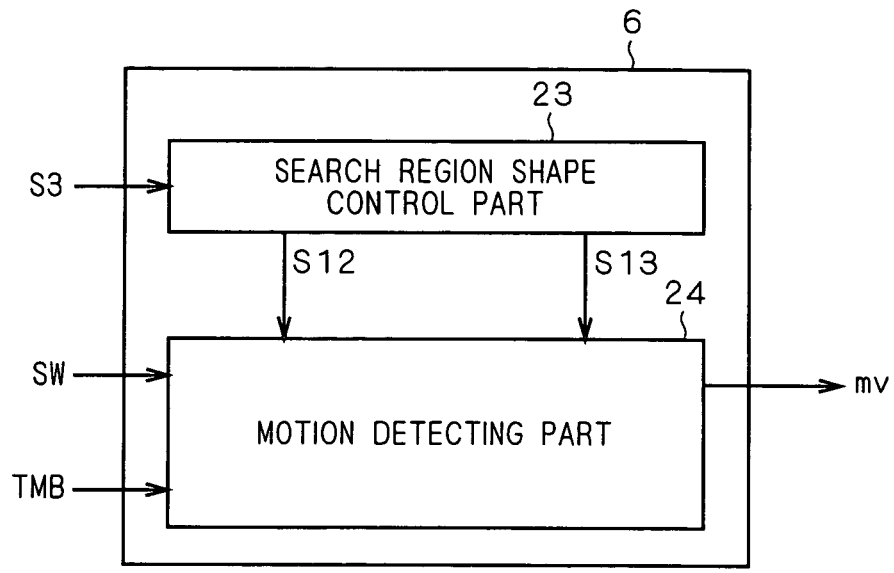
FIG. 27 is a block diagram illustrating the internal configuration of a search region variable-shaped motion detecting device according to an eleventh preferred embodiment of the invention.

FIG. 27 is a block diagram illustrating the internal configuration of a search region variable-shaped motion detector 6 according to an eleventh preferred embodiment of the invention. The motion detector 6 corresponds to the search region variable-shaped motion detector 2 of the first preferred embodiment shown in FIG. 1.

As shown, the search region variable-shaped motion detector 6 includes a search region shape control part 23 and a motion detecting part 24. The control part 23 determines a search region similarly to the search region shape control part 21 based on the overall motion information S3 obtained from the overall motion information generator 3 and outputs the reference image selection signal S12 and the other selection signal S13 for realizing the determined search region, to the motion detecting part 24.

Since the search region shape control part 23 indicates selection of the reference image selection signal S12 for only one current image TMB, the current image selection signal S11 becomes unnecessary.

Upon receipt of reference image data SW and current image data TMB, the motion detecting part 24 performs a comparison operation between the reference image data SW and current image data TMB in a search region determined by the reference image selection signal S12, and outputs a motion vector mv based on the result of comparison.

Figure 28:
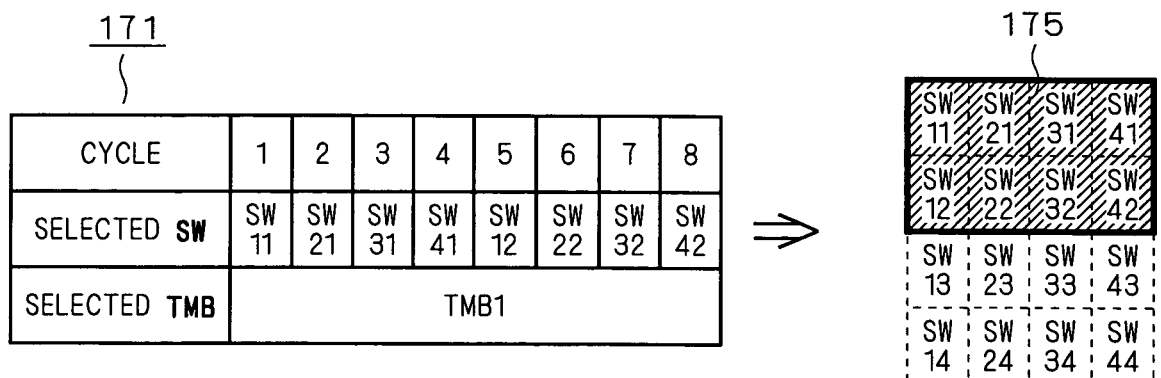
FIG. 28 is a first illustrative example of relationship of details on selection control of reference image data SW and current image data TMB with the shape of a resulting search region.
Figure 29:
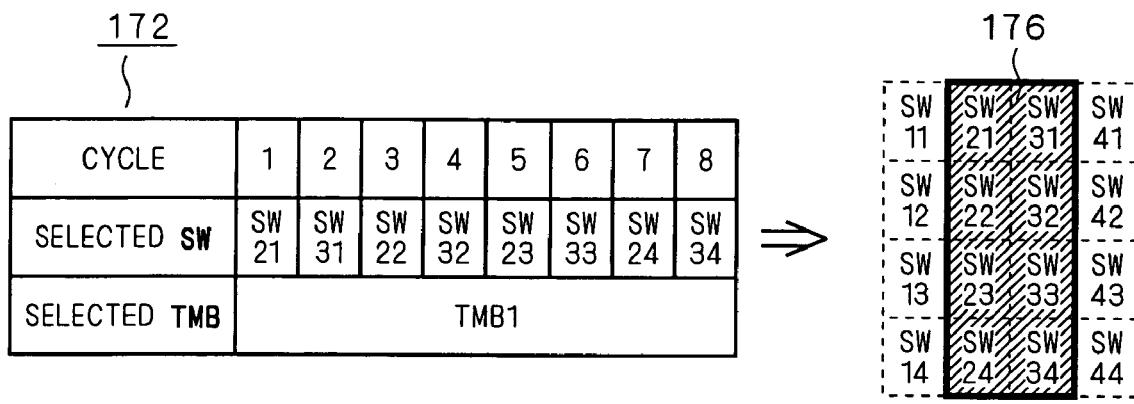
FIG. 29 is a second illustrative example of relationship of details on selection control of reference image data SW and current image data TMB with the shape of a resulting search region.
Figure 30:
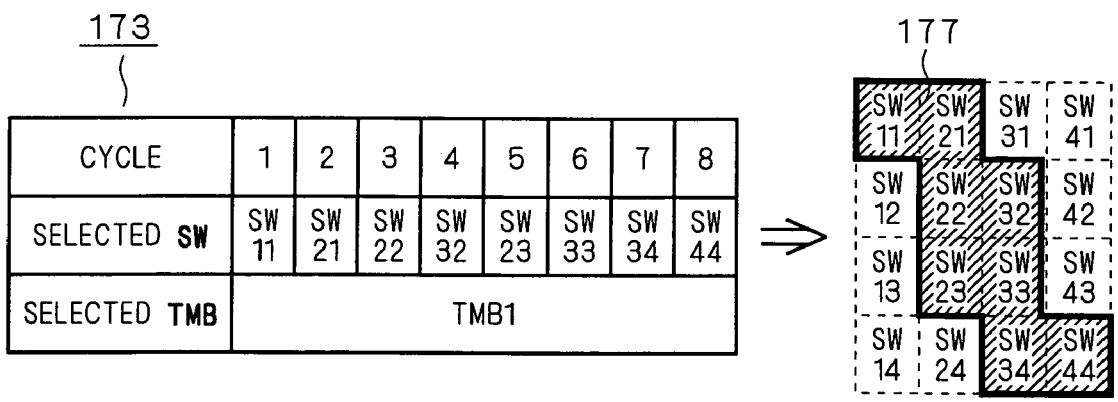
FIG. 30 is a third illustrative example of relationship of details on selection control of reference image data SW and current image data TMB with the shape of a resulting search region.

FIGS. 28 to 30 are illustrative examples of relationship of details on selection control of reference image data SW and current image data TMB with the shape of a resulting search region. In these examples, it is assumed that the number of macroblocks that can be selected by reference image data SW is sixteen, operational capability is eight cycles and a comparison between reference image data SW and current image data TMB can be performed by block in one cycle.

In a first selection example 171 shown in FIG. 28, reference images SW11, SW21, SW31, SW41, SW12, SW22, SW32 and SW42 are each subjected to a comparison operation with the current images TMB1, thereby determining a horizontally-oriented rectangular search region 175 having an area of 8 macroblocks.

In a second selection example 172 shown in FIG. 29, the reference images SW21, SW31, SW22, SW32, SW23, SW33, SW24 and SW34 are each subjected to a comparison operation with the current images TMB1, thereby determining a vertically-oriented rectangular search region 176 having an area of 8 macro bocks.

In a third selection example 173 shown in FIG. 30, the reference images SW11, SW21, SW22, SW32, SW23, SW33, SW34 and SW44 are each subjected to a comparison operation with the current images TMB1, thereby determining a rectangular search region 177 extending downward to the right having an area of 8 macro bocks.

As described, in the present embodiment, a selection signal for determining a search region outputted from the search region shape control part 23 is only the reference image selection signal S12, in addition to the effects exerted by the first preferred embodiment.

Twelfth Preferred Embodiment

While the renewal timing (predetermined timing) of search region (search shape) is on a picture basis in the first preferred embodiment, the search shape is determined by macroblock, not by picture in a twelfth preferred embodiment of the invention.

Figure 31:
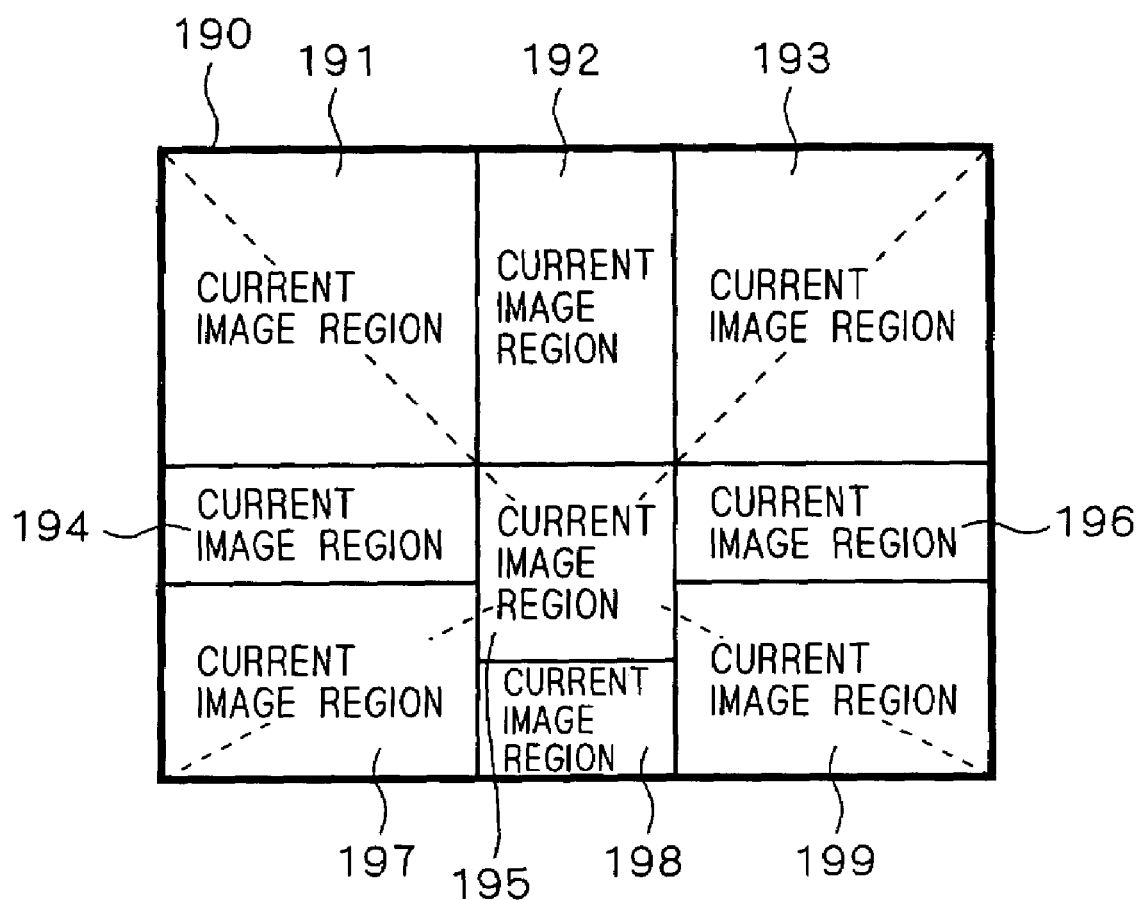
FIG. 31 is an illustrative example of the feature according to a twelfth preferred embodiment of the invention.

FIG. 31 is an illustrative example of a screen 190 divided into nine regions. On a screen seen by a driver of a car moving at high speed, a motion is assumed to vary radially from the center of a current image region 195. In the present embodiment, a search shape is changed by macroblock focusing attention to such motion.

Upon receipt of the overall motion information S3, and when the information S3 indicates the above-described radial variations of motion, the search region shape control part 21 of the present embodiment selects a search shape by macroblock from among the search shapes 71 to 75 according to which one of current image regions 191 to 199 macroblocks of the current image TMB belong to. Hereinbelow, such selection will be described.

When macroblocks of the current image TMB belong to any one of the current image regions 192, 194, 195, 196 and 198, the search shape 73 is selected. Besides, for the current image region 192, a direction from the reference point of search region is determined such that a variation particularly in the upward direction is searched as with the search region 123 shown in FIG. 20. For the current image region 194, a direction is determined such that a variation particularly in the left direction is searched. For the current image region 196, a direction is determined such that a variation particularly in the right direction is searched. For the current image region 198, a direction is determined such that a variation particularly in the downward direction is searched as with the search region 121 shown in FIG. 18.

For the current image region 191, the search shape 71 is adopted. Besides, a direction from the reference point of search region is determined such that a variation particularly in the upward direction to the left is searched. For the current image region 193, the search shape 75 is adopted. Besides, a direction is determined such that a variation particularly in the upward direction to the right is searched.

For the current image region 197, the search shape 75 is adopted. Besides, a direction from the reference point of search region is determined such that a variation particularly in the downward direction to the left is searched. For the current image region 199, the search shape 71 is adopted. Besides, a direction is determined such that a variation particularly in the downward direction to the right is searched.

Since other operations are the same as those in the fourth preferred embodiment, the motion detecting device of the present embodiment exerts the same effects as those in the fourth preferred embodiment. Further, the motion detecting device of the present embodiment changes a search shape and a direction from the reference point of search region by macroblock. Thus, the motion vector mv of high accuracy can be obtained with more effective processing.

Although the present embodiment has described the basic shape of search region as parallelogram, other shapes may be adopted.

While the invention has been shown and described in detail, the foregoing description is in all aspects illustrative and not restrictive. It is therefore understood that numerous modifications and variations can be devised without departing from the scope of the invention.

What is claimed is:

1. A motion detecting device for generating a motion vector in image data to be encoded, comprising:

an overall motion information generator configured to generate overall motion information indicative of overall motion of an image specified by said image data; and a search region variable-shaped motion detector configured to determine a search shape as a determined search shape based on said overall motion information and to set a search region having an area determined by said determined search shape and operational capability of said search region variable-shaped motion detector, and to perform a comparison operation in said search region between current image data and reference image data in said image data, thereby generating a motion vector, wherein said determined search shape varies at a predetermined timing as said overall motion information varies.

2. The motion detecting device according to claim 1, wherein said overall motion information includes control information of an image capturing part for capturing an image to obtain said image data.

3. The motion detecting device according to claim 2, wherein said control information includes at least one of a moving direction, an angular speed and a focal length of said image capturing part.

4. The motion detecting device according to claim 1, wherein said overall motion information generator generates said overall motion information based on motion vector related information including a plurality of motion vectors corresponding to said image data in a predetermined unit and evaluation values of said plurality of motion vectors.

5. The motion detecting device according to claim 4, wherein said overall motion information generator obtains a distribution value of said plurality of motion vectors and judges reliability of said distribution value based on said motion vector related information, thereby generating said overall motion information indicative of a motion in a direction where said distribution value is high when said reliability is high and indicative of a motion in a direction where said distribution value is low when said reliability is low.

6. The motion detecting device according to claim 1, wherein said search region variable-shaped motion detector selects one of various types of rectangular search shapes as said determined search shape.

7. The motion detecting device according to claim 1, wherein said search region variable-shaped motion detector selects one of various types of rhombus search shapes as said determined search shapes.

8. The motion detecting device according to claim 1, wherein said search region variable-shaped motion detector selects one of various types of parallelogrammic search shapes as said determined search shape.

9. The motion detecting device according to claim 1, wherein said search region variable-shaped motion detector selects one of various types of basic shapes including at least two of rectangle, rhombus and parallelogram as said determined search shape.

10. The motion detecting device according to claim 1, wherein
said search region variable-shaped motion detector is capable of determining one of various types of search shapes having different search accuracies as said determined search shape.

11. The motion detecting device according to claim 1, wherein
said search region variable-shaped motion detector changes an extending direction of said search region with respect to a predetermined reference point at said predetermined timing.

12. The motion detecting device according to claim 1, wherein
said predetermined timing includes a unit of picture of said image data.

13. The motion detecting device according to claim 1, wherein
said predetermined timing includes a unit of slice of said image data.

14. The motion detecting device according to claim 1, wherein
said predetermined timing includes a unit of macroblock of said image data.

15. The motion detecting device according to claim 1, wherein
said search region includes a search region formed on a macroblock basis.

16. The motion detecting device according to claim 1, wherein
said search region variable-shaped motion detector is provided within a video encoding device.

17. A search region variable-shaped motion detector for detecting a motion vector in image data to be encoded, comprising:
a search region shape control part configured to receive overall motion information indicative of overall motion of an image and to determine a search shape as a determined search shape based on said overall motion information and to set a search region having an area determined by said determined search shape and predetermined operational capability, and to output a selection signal for selecting, by a predetermined unit, at least one of current image and reference image in said image data in accordance with said search region; and a motion detecting part configured to perform a comparison operation between said reference image and said current image in said image data based on said selection signal, thereby detecting said motion vector, wherein said predetermined operational capability includes operational capability of said motion detecting part.

* * * * *